(12) United States Patent
Ito (10) Patent No.: US 7,384,889 B2
(45) Date of Patent: Jun. 10, 2008

(54) EXHAUST GAS PURIFYING CATALYST AND EXHAUST GAS PURIFYING SYSTEM

(75) Inventor: Junji Ito, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 953 days.

(21) Appl. No.: 10/862,469

(22) Filed: Jun. 8, 2004

(65) Prior Publication Data

US 2004/0254069 A1 Dec. 16, 2004

(30) Foreign Application Priority Data

Jun. 13, 2003 (JP) ............... 2003-168739
Apr. 1, 2004 (JP) ............... 2004-109324

(51) Int. Cl.
*B01J 23/00* (2006.01)
*B01J 23/40* (2006.01)
*B01J 23/42* (2006.01)
*B01J 21/00* (2006.01)
*B01J 20/00* (2006.01)

(52) U.S. Cl. ............ 502/327; 502/304; 502/332; 502/333; 502/334; 502/339; 502/355; 502/415; 502/439; 502/527.13

(58) Field of Classification Search ........... 502/304, 502/327, 332, 333, 334, 339, 355, 415, 439, 502/527.13
See application file for complete search history.

(56) References Cited

U.S. PATENT DOCUMENTS

| | | | | |
|---|---|---|---|---|
| 4,469,816 A | * | 9/1984 | Armor et al. | 502/333 |
| 5,128,306 A | | 7/1992 | Dettling et al. | |
| 5,171,728 A | * | 12/1992 | Sakurai et al. | 502/178 |
| 5,179,060 A | * | 1/1993 | Subramanian et al. | 502/332 |
| 6,159,623 A | * | 12/2000 | Tanaka | 428/670 |
| 6,254,842 B1 | | 7/2001 | Hu et al. | |
| 6,475,951 B1 | * | 11/2002 | Domesle et al. | 502/325 |
| 6,709,643 B1 | * | 3/2004 | Ozkan et al. | 423/239.1 |
| 6,896,857 B2 | * | 5/2005 | Nakamura et al. | 423/213.5 |
| 2006/0062704 A1 | * | 3/2006 | Liu et al. | 422/177 |

FOREIGN PATENT DOCUMENTS

| | | |
|---|---|---|
| EP | 0 393 612 A2 | 10/1990 |
| JP | 2000-154713 A | 6/2000 |
| JP | 2002-273225 A | 9/2002 |

* cited by examiner

*Primary Examiner*—Cam N. Nguyen
(74) *Attorney, Agent, or Firm*—Foley & Lardner LLP (57) ABSTRACT

An exhaust gas purifying catalyst of the present invention contains alumina, and ceria loading palladium and platinum, and the ratio of palladium (IV) oxide to palladium (II) oxide by peak separation of the 3d orbital of palladium in X-ray photoelectron spectroscopy is within a range from 70:30 to 99:1. Thereby, the catalyst is capable of reducing the CO concentration and increasing the $H_2$ concentration in an exhaust gas even after durability at high temperature.

22 Claims, 9 Drawing Sheets

EXHAUST GAS PURIFYING CATALYST AND EXHAUST GAS PURIFYING SYSTEM

BACKGROUND OF THE INVENTION

1. Field of the Invention

The present invention relates to an exhaust gas purifying catalyst and an exhaust gas purifying system. More specifically, the present invention relates to an exhaust gas purifying catalyst and an exhaust gas purifying system, enhancing the hydrogen concentration in an exhaust gas.

2. Description of the Related Art

Conventionally, there are suggested various catalysts for purifying carbon monoxide from a gas containing carbon monoxide (CO) and hydrogen ($H_2$). Regarding fuel reforming catalysts, a ruthenium-based catalyst is known as a catalyst of causing a CO shift reaction (see Japanese Patent Application Laid-open No. 2002-273225). Regarding automobile exhaust gas purifying systems, a catalyst containing a noble metal loaded on ceria-based oxide is known as a catalyst of reducing CO and allowing permeation of $H_2$ (see Japanese Patent Application Laid-open No. 2000-154713).

SUMMARY OF THE INVENTION

However, in conventional CO purifying catalysts, no catalysts are found maintaining a purifying performance even after durability at high temperature.

In the above-mentioned catalyst containing a noble metal loaded on ceria-based oxide, a CO oxidation reaction and a CO shifting reaction progress in this order. In the CO shifting reaction, the CO concentration decreases by the reaction, accompanied by production of $H_2$, therefore, this reaction is preferable for CO reduction and $H_2$ production. However, with the above-mentioned catalyst, a $H_2$ oxidation reaction may progress in some cases together with the CO oxidation reaction. That is, the above-mentioned catalyst has a room for improvement since $H_2$ reduction also occurs together with CO reduction.

The present invention has been achieved with a view to the problems of the above conventional technologies, and an object thereof is to provide an exhaust gas purifying catalyst and an exhaust gas purifying system, capable of reducing the CO concentration and increasing the $H_2$ concentration in an exhaust gas even after durability at high temperature.

The first aspect of the present invention provides an exhaust gas purifying catalyst comprising: alumina; and ceria loading palladium and platinum, wherein the ratio of palladium (IV) oxide to palladium (II) oxide by peak separation of the 3d orbital of palladium in X-ray photoelectron spectroscopy is within a range from 70:30 to 99:1.

The second aspect of the present invention provides an exhaust gas purifying system comprising: an exhaust gas purifying catalyst including alumina, and ceria loading palladium and platinum, wherein the ratio of palladium (IV) oxide to palladium (II) oxide by peak separation of the 3d orbital of palladium in X-ray photoelectron spectroscopy is within a range from 70:30 to 99:1.

BRIEF DESCRIPTION OF THE DRAWINGS

The invention will now be described with reference to the accompanying drawings wherein.

DETAILED DESCRIPTION OF THE PREFERRED EMBODIMENT

The exhaust gas purifying catalyst and exhaust gas purifying system of the present invention will be illustrated in detail below. In this specification, "%" represents percentage by weight unless otherwise stated.

The exhaust gas purifying catalyst of the present invention contains ceria ($CeO_2$) loading palladium (Pd) and platinum (Pt), and alumina. Further, in the catalyst of the present invention, the ratio of palladium (IV) oxide ($PdO_2$) to palladium (II) oxide (PdO) by peak separation of the 3d orbital of Pd in X-ray photoelectron spectroscopy (XPS) is within a range from 70:30 to 99:1. Such a catalyst is used in exposure to an exhaust gas varying in a wide range from lean to rich, and enhances the $H_2$ concentration of the exhaust gas. Here, the lean is that the air/fuel ratio is below 14.6, and the rich is that the air/fuel ratio exceeds 14.6.

Figure 1:
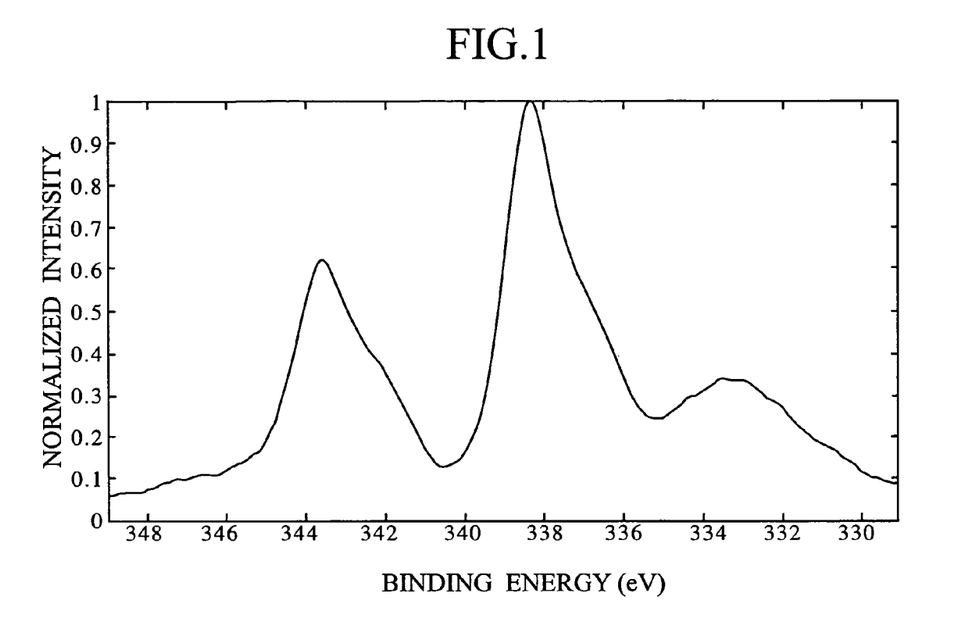
FIG. 1 is a graph showing one example of results of XPS measurement of an exhaust gas purifying catalyst of the present invention.
Figure 2:
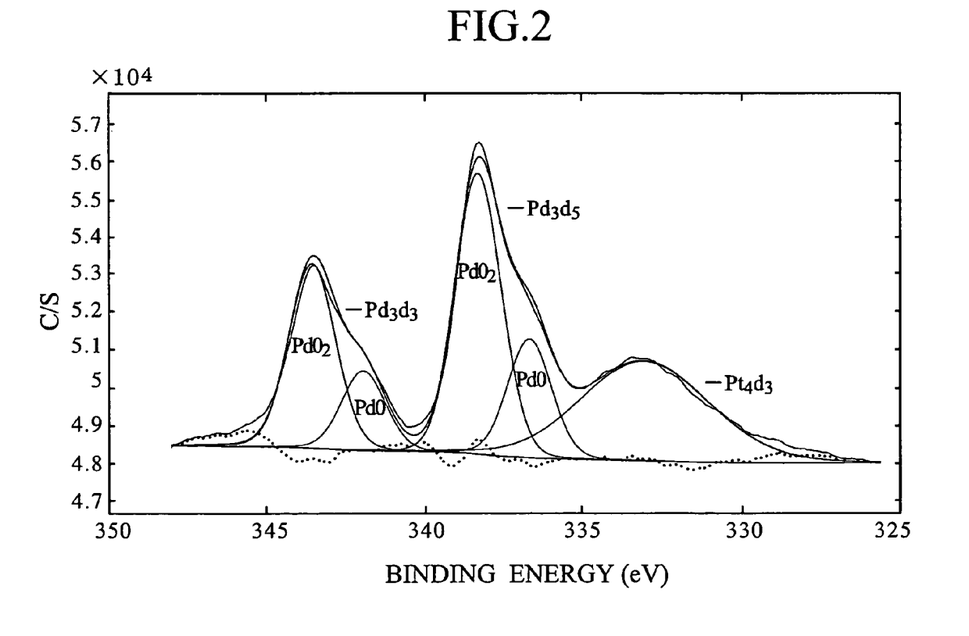
FIG. 2 is a graph showing results of peak separation of $PdO_2$ and PdO in the 3d orbital of Pd in FIG. 1.
Figure 3:
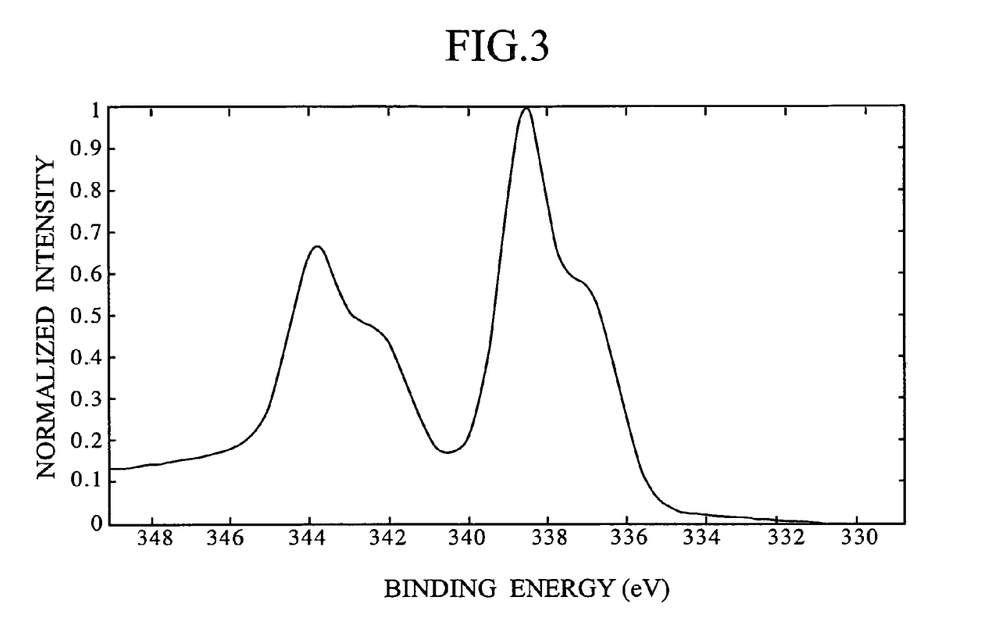
FIG. 3 is a graph showing one example of results of XPS measurement of a catalyst loading only Pd on ceria.
Figure 4:
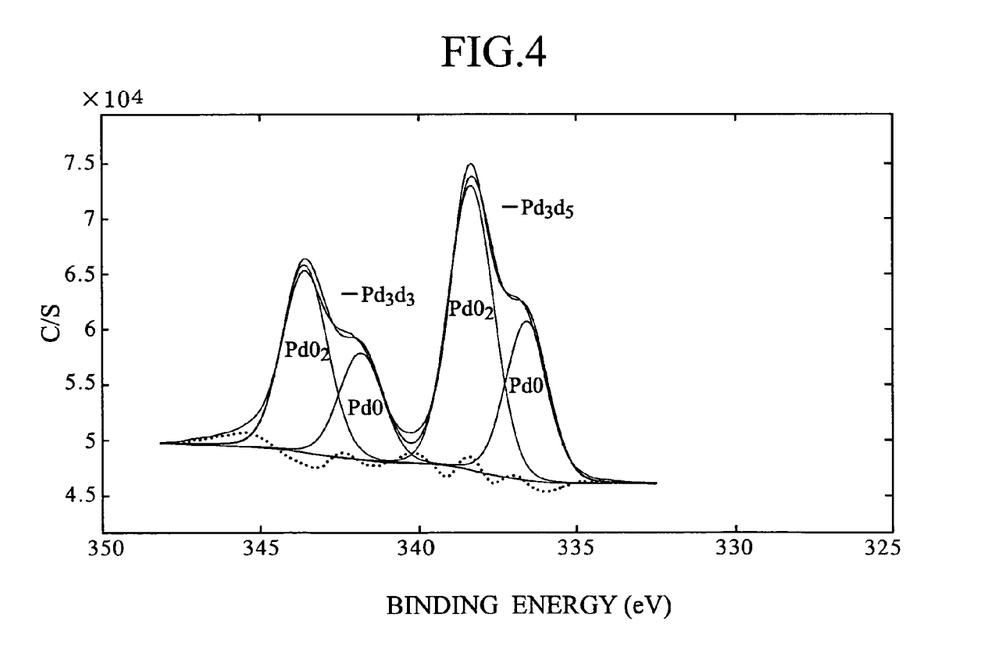
FIG. 4 is a graph showing results of separation of $PdO_2$ and PdO in the 3d orbital of Pd in FIG. 3.

FIG. 1 shows one example of results of XPS measurement of an exhaust gas purifying catalyst of the present invention, and FIG. 2 shows results of separation of $PdO_2$ and PdO in the 3d orbital of its Pd. FIG. 3 shows one example of results of XPS measurement of a catalyst loading only Pd on ceria, and FIG. 4 shows results of separation of $PdO_2$ and PdO in the 3d orbital of its Pd. Since Pd and Pt are allowed to coexist on ceria in the catalyst of the present invention, Pd and Pt significantly interact with each other, thus giving separation results as shown in FIG. 2. When FIG. 2 and FIG. 4 are compared, the ratio of $PdO_2$ to PdO in the present invention differs greatly from the ratio in the case of single loading of Pd on ceria. The ratio of $PdO_2$ to PdO in the 3d orbital of Pd in XPS means the peak area ratio of $PdO_2$ to PdO in the 3d orbital.

The ratio of $PdO_2$ to PdO is required to be within a range from 70:30 to 99:1 since when $PdO_2$ is higher, the performance of the CO shift reaction is improved. When the ratio of $PdO_2$ to PdO is out of the above-mentioned range, the CO shift reaction decreases, leading to insufficient production of $H_2$. Namely, it is hypothesized that when the ratio of PdO increases, the mutual action of Pd and Pt becomes scarce, and the condition of single Pd becomes dominant. When Pd is present singly on ceria, the reaction (i) is promoted among reactions of the following reaction formulae, resultantly, production of $H_2$ becomes insufficient.

$$H_2 + O(OSC) \rightarrow H_2O \quad \text{(i)}$$

$$CO + (OSC) \rightarrow CO_2 \quad \text{(ii)}$$

Here, "O(OSC)" in the above-mentioned formulae (i) and (ii) means an oxygen atom derived from an oxygen storage material, and in the present invention, ceria corresponds to this oxygen storage material.

Figure 5:
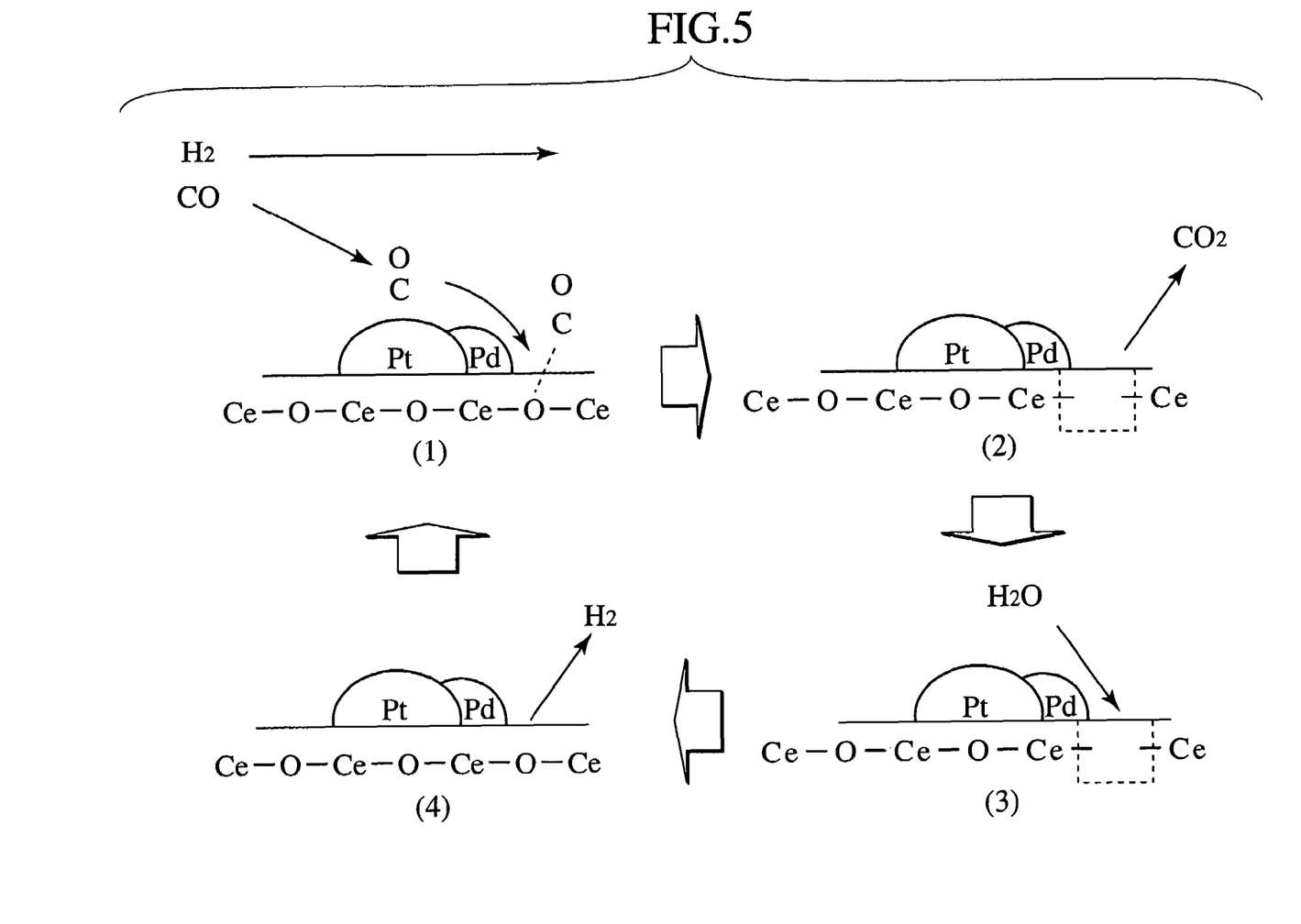
FIG. 5 is a view for illustrating the action mechanism of improvement in shifting performance by relaxation of CO poisoning.

Though the action mechanism of the catalyst of the present invention is not known yet, an action mechanism of improving a CO shift performance currently guessed is shown in FIG. 5. As shown in FIG. 5, Pd and Pt coexist on ceria in the catalyst of the present invention. As shown in FIG. 5 (1), it is known that CO among $H_2$ and CO and the like generated under rich condition has high affinity with Pt, and resultantly is adsorbed on Pt. Since Pd is present near Pt in this stage, CO shifts from Pt onto Pd, thus relaxing CO poisoning of Pt. CO on Pd reacts with ceria to extract an oxygen atom, and leaves in the form of $CO_2$ as shown in FIG. 5 (2). As shown in FIG. 5 (3), ceria partially lacking in an oxygen atom adsorbs water ($H_2O$), which is generated in rich spike, and extracts an oxygen atom. The adsorbed $H_2O$ leaves in the form of $H_2$ as shown in FIG. 5 (4), thus increasing the $H_2$ concentration in an exhaust gas. It is believed that progress of the CO shift reaction is promoted by such a cycle.

Thus, the exhaust gas purifying catalyst of the present invention can reduce the CO concentration without reducing the $H_2$ concentration in an exhaust gas. The process of extraction of an oxygen atom of ceria is believed to be the rate-determining step though it is illustrated as shown in FIG. 5 in convenience. Namely, it is believed that this cycle progresses in extremely short period of time by an equilibrium reaction via an action of the oxygen storage ability of ceria, though it is influenced also by conditions to which the catalyst is exposed.

In the exhaust gas purifying catalyst of the present invention, it is preferable that the content ratio of Pd to Pt is within a range from 0.01:1 to 0.3:1 by weight. When the content ratio of Pd is less than 0.01, the amount of Pd is too small, consequently, there is a possibility of no mutual reaction with Pt. When the content ratio of Pd is over 0.3, the ratio of PdO increases, thus giving a possibility that the above-mentioned ratio of $PdO_2$ to PdO cannot be maintained. By this, the above-mentioned property of the oxidation reaction of single Pd emerges, giving a possibility of exhibiting a reverse influence on selective purification of CO, that is, enhancement of the $H_2$ concentration in an exhaust gas.

In the exhaust gas purifying catalyst of the present invention, it is desirable that rhodium (Rh) is further contained. It is believed that a nitrogen oxide (NOx) in an exhaust gas is turned to nitrogen dioxide ($NO_2$) being present on ceria as an oxygen storage material. If $NO_2$ is present on ceria, adsorption of CO onto Pt is inhibited, leading to insufficient progress of the CO shift reaction. By further inclusion of Rh in the catalyst of the present invention, a CO—NOx reaction and HC—NOx reaction occur by CO, NOx and a hydrocarbon (HC) which is an exhaust gas component, resultantly, NOx on ceria can be removed. Consequently, NOx poisoning of Pt, Pd and ceria can be relaxed, CO is selectively purified, and the $H_2$ concentration in an exhaust gas can be increased.

Further, when Rh is further contained, zirconia-containing alumina is desirably used. Accordingly, forming a solid solution of Rh and alumina can be suppressed, and decrease in a NOx poisoning relaxing performance of Rh can be suppressed.

Though it is described above that NOx existing in an exhaust gas is turned to $NO_2$ which is present on ceria as an oxygen storage material, is has been found by further detailed analysis that (i) the exhaust gas purifying catalyst of the present invention adsorbs NOx in a lean region and releases NOx in a rich region, and (ii) when Rh is not contained, NOx poisoning is not relaxed, and further NOx purification is not conducted. By inclusion or Rh, the NOx purification rate with a single use of the catalyst of the present invention is improved. It is preferable to further place another NOx purifying catalyst at least downstream of the catalyst of the present invention, since the flow rate of NOx into the downstream NOx purifying catalyst decreases. This is described in detail later.

In the exhaust gas purifying catalyst of the present invention, by inclusion of Rh, it becomes possible to improve also the NOx purification rate at a cold start (at the time of starting an engine, or the like), that is, inclusion of Rh is preferable also in this point.

Further, the catalyst of the present invention containing Rh has a property that it adsorbs NOx when the catalyst temperature is low. Usual exhaust gas purifying catalysts do not occur a catalytic activity until they reach a certain temperature. The catalyst of the present invention has an initiation temperature of the catalytic activity after a durability test of 300 to 330° C. However, since the catalyst of the present invention has a function of adsorbing NOx before generation of catalytic activity, it is possible that it adsorbs NOx from cold start until the catalyst reaches the activity initiation temperature, and after activation of the catalyst, purification is conducted while releasing NOx.

Figure 6:
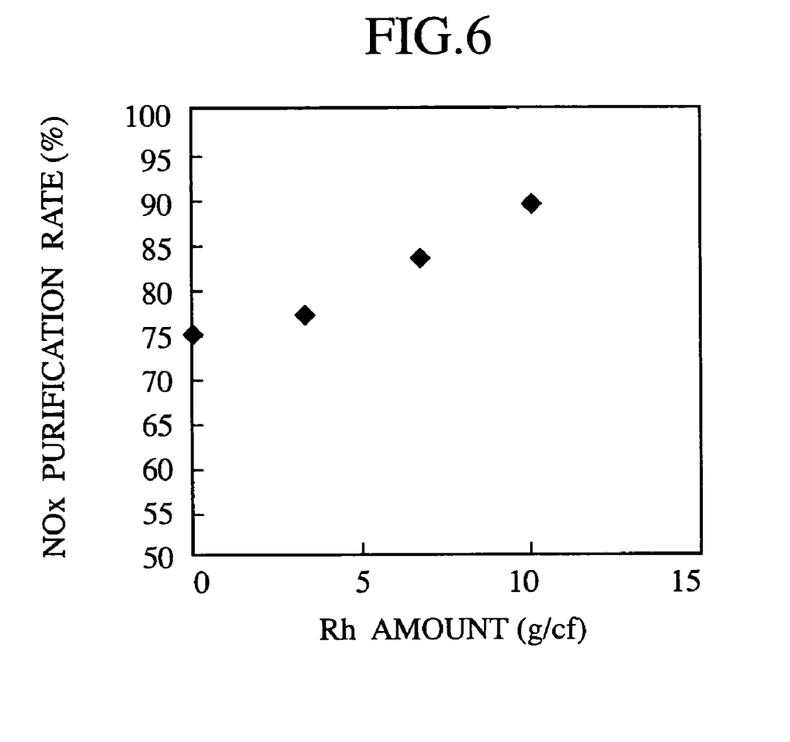
FIG. 6 is a graph showing a correlation between the Rh amount and NOx purification rate.
Figure 7:
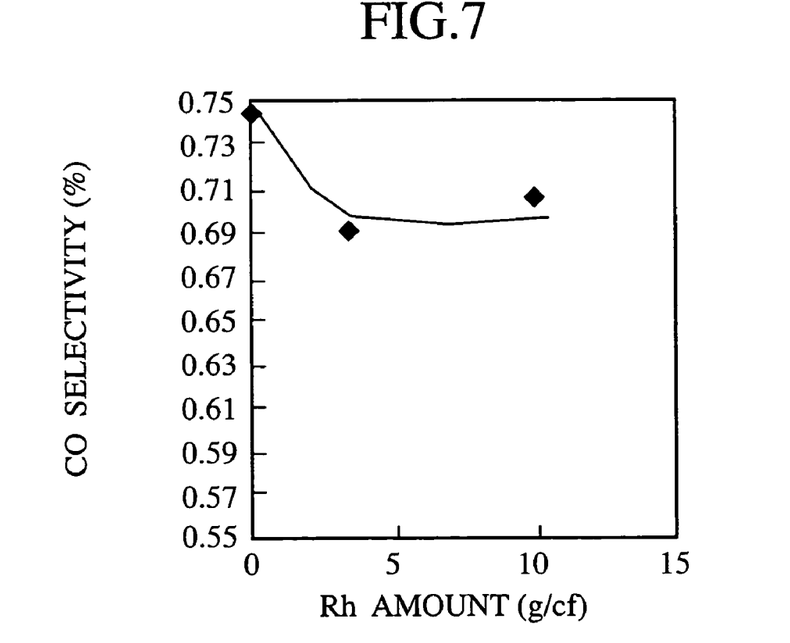
FIG. 7 is a graph showing a correlation between the Rh amount and the CO selectivity.

FIG. 6 shows a correlation between the Rh amount and NOx purification rate after a durability test. As shown in this figure, the Rh content and the NOx purification rate are in such proportional relation that the NOx purification rate increases when the Rh content increases. On the other hand, when the Rh content is too large, a $H_2$ oxidation reaction is promoted, and a function of enhancing the $H_2$ concentration decreases. FIG. 7 shows a correlation between the Rh amount and the CO selectivity. "CO selectivity" represents CO reaction amount/($H_2$ reaction amount+CO reaction amount). As shown in this figure, even if the Rh amount increases, the CO selectivity does not increase. Therefore, the Rh content is preferably within a range from 0.01 to 1 g per 1 liter of a catalyst, and more preferably from 0.1 to 0.4 g per 1 liter of a catalyst, in terms of Rh content, from the standpoint of improvement in the NOx purification rate and maintenance of the $H_2$ enrichment function. When Rh is contained in such a range, NOx adsorbed on ceria is purified approximately securely. Here, "cf" in FIGS. 6 and 7 is an abbreviation of "Cubic Feet", and 1 cf is 28.32 liter.

It is effective that the exhaust gas purifying catalyst of the present invention is coated on a substrate. As the substrate, there are used monolithic substrates and honeycomb substrates made of heat resistant materials such as ceramics such as cordierite and the like, metals such as ferrite stainless and the like.

An exhaust gas purifying system of the present invention will be illustrated next.

Figure 8:
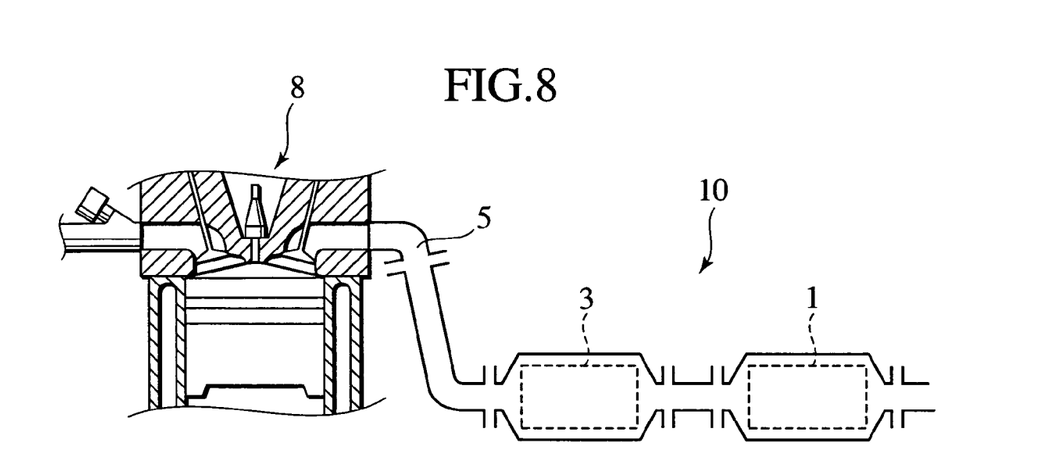
FIG. 8 is a schematic view showing the constitution of a first exhaust gas purifying system of the present invention.

As shown in FIG. 8, in a first exhaust gas purifying system 10 of the present invention, an exhaust gas purifying catalyst 1 of the present invention is provided downstream of an exhaust gas passage 5, further, a noble metal catalyst 3 containing Pd is provided upstream of the catalyst 1. In the first exhaust gas purifying system 10 of the present invention, oxygen ($O_2$) remaining in rich spike can be reacted quickly with a hydrocarbon (HC) and the like to significantly remove the oxygen by placing the noble metal catalyst 3 upstream of the catalyst 1 of the present invention. By this, progress of a CO oxidation reaction on the catalyst 1 of the present invention can be suppressed, and progress of a CO shift reaction can be promoted, thus increasing the $H_2$ concentration in an exhaust gas. In FIG. 8, the reference numeral 8 represents an engine.

A second exhaust gas purifying system of the present invention will be illustrated next.

Figure 9:
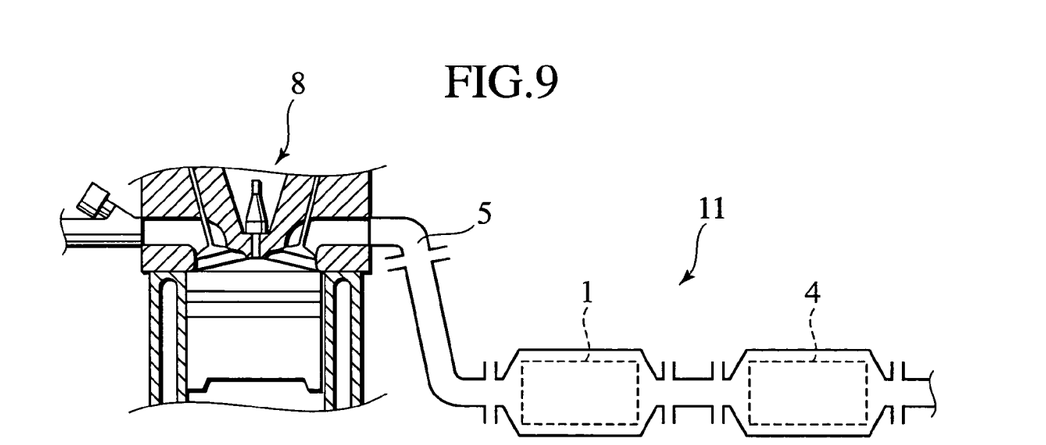
FIG. 9 is a schematic view showing the constitution of a second exhaust gas purifying system of the present invention.

As shown in FIG. 9, in a second exhaust gas purifying system 11 of the present invention, an exhaust gas purifying catalyst 1 of the present invention is provided upstream of an exhaust gas passage 5, further, a NOx purifying catalyst 4 is provided downstream of the catalyst 1. As described above, by use of the catalyst 1 of the present invention further containing Rh, the flow rate of NOx into the NOx purifying catalyst 4 is reduced. Namely, since the flow rate of NOx to be purified by the NOx purifying catalyst 4 decreases, it is preferable. The NOx purifying catalyst means a catalyst of purifying mainly NOx such as a NOx storage reduction catalyst and the like.

Regarding the NOx purifying catalyst 4, it has been found by detailed investigation that when the flow rate of NOx to be purified by the NOx purifying catalyst itself decreases, the NOx purification rate increases with single use of the NOx purifying catalyst, irrespective of the $H_2/CO$ ratio. Therefore, when NOx purification is conducted with the catalyst 1 provided upstream of the NOx purification catalyst 4, the NOx purification rate in the total exhaust gas purifying system aspect can be improved. Further, the catalyst 1 having remarkably high $H_2/CO$ ratio after passing through the catalyst as compared with conventional three-way catalysts enhances the NOx purifying performance of the NOx purifying catalyst 4, and the NOx purifying catalyst 4 shows higher NOx purification rate.

Improvement in the NOx purification rate in the total aspect of the second exhaust gas purifying system 11 of the present invention as described above is ascribable to a double-effect of an effect that by the exhaust gas purifying catalyst 1 of the present invention containing Rh, the $H_2$ enrichment performance of the catalyst 1 is further exhibited, leading to enhancement of the NOx purifying performance of the NOx purifying catalyst 4, and an effect that the NOx purifying performance of the catalyst 1 itself is enhanced. Such an effect is not obtained easily when two conventional NOx purifying catalysts placed in series, and when a conventional three-way catalyst is placed at the former stage of a NOx purifying catalyst. This point will be illustrated with specific examples.

Figure 10A:
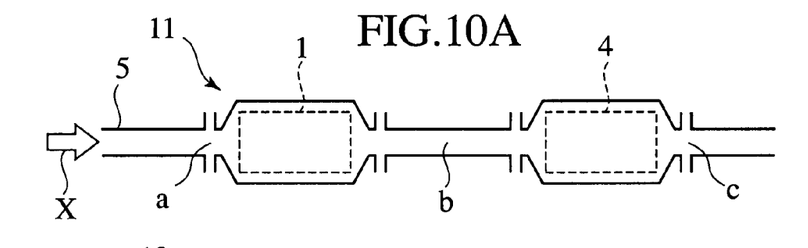
FIG. 10A is a schematic view showing the constitution of a second exhaust gas purifying system of the present invention.
Figure 10B:
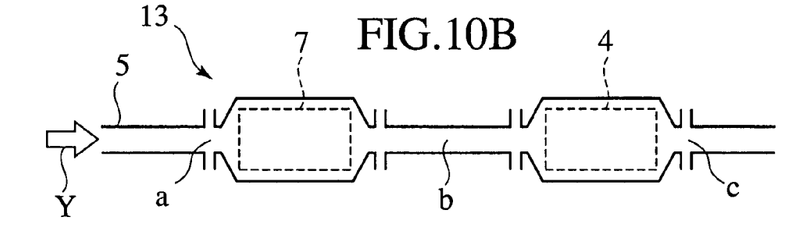
FIG. 10B is a schematic view showing the constitution of an exhaust gas purifying system not included in the scope of the present invention.

FIG. 10A shows the constitution of the second exhaust gas purifying system of the present invention and FIG. 10B shows one example of the constitution of an exhaust gas purifying system not included in the scope of the present invention. As shown in FIG. 10A, an exhaust gas purifying system 11 of the present invention includes a catalyst 1 of the present invention and a NOx purifying catalyst 4 in an exhaust gas passage 5.

Figure 12:
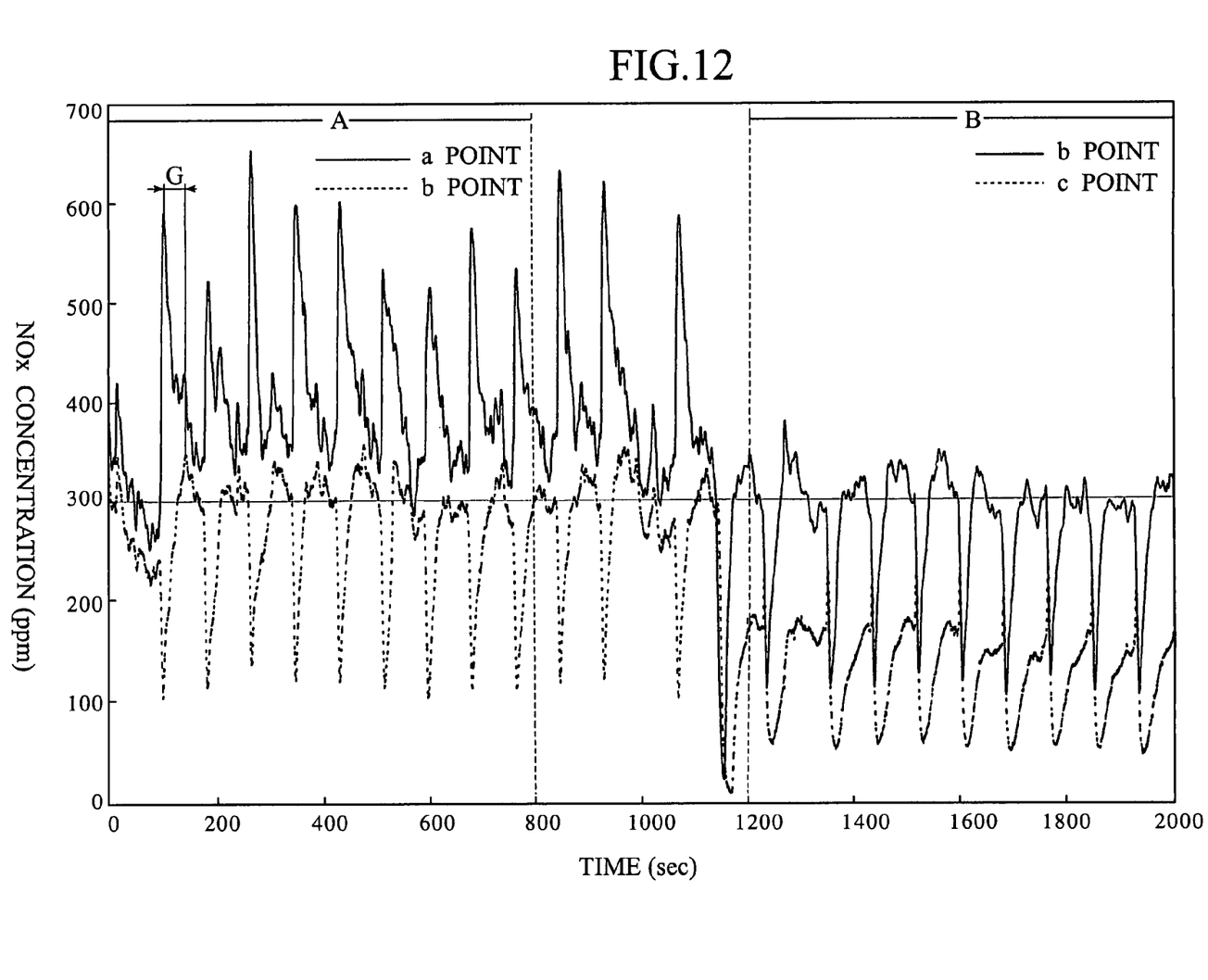
FIG. 12 is a graph showing a correlation between the time and the NOx concentration in a second exhaust gas purifying system of the present invention.

Here, a model gas is flown along the direction of an arrow X, and lean of 40 seconds and rich of 2 seconds are repeated, and the NOx concentration is measured at point a near the inlet of the catalyst 1, at a point b near the outlet of the catalyst 1 and near the inlet of the NOx purifying catalyst 4, and at point c near the outlet of the NOx purifying catalyst 4. The results are shown in FIG. 12. In the graph of FIG. 12, the $H_2$ concentration is 2.4% by volume, the CO concentration is 11.9% by volume, and the NOx concentration is about 300 ppm, at the point b.

On the other hand, as shown in FIG. 10B, an exhaust gas purifying system 13 not included in the scope of the present invention includes a conventionally known three-way catalyst 7 and a NOx purifying catalyst 4 in an exhaust gas passage 5.

Figure 13:
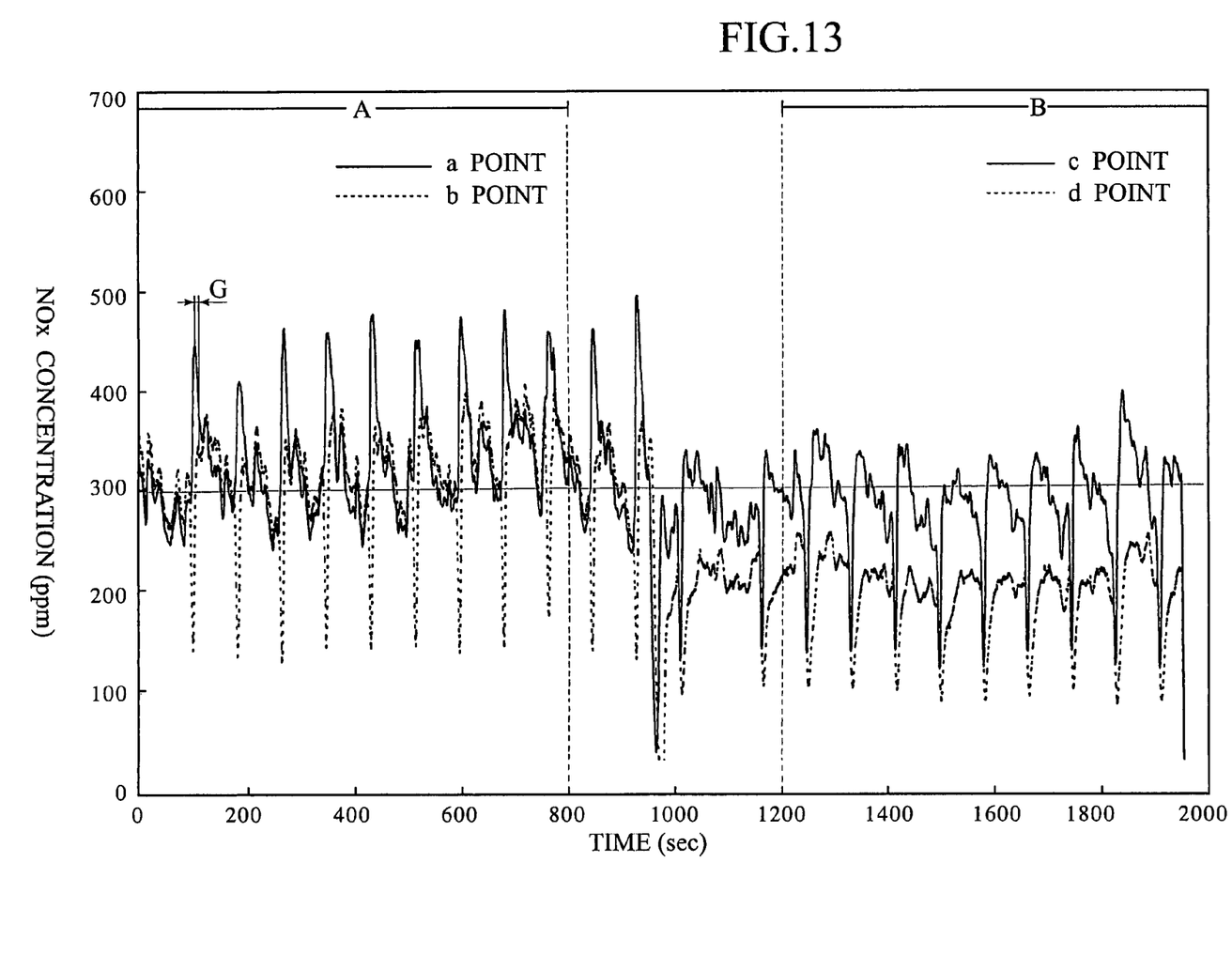
FIG. 13 is a graph showing a correlation between the time and the NOx concentration in an exhaust gas purifying system not included in the scope of the present invention.

Likewise, a model gas is flown along the direction of an arrow Y, and lean of 40 seconds and rich of 2 seconds are repeated, and the NOx concentration is measured at point a near the inlet of the three-way catalyst, at a point b near the outlet of the three-way catalyst 1 and near the inlet of the NOx purifying catalyst 4, and at point c near the outlet of the NOx purifying catalyst 4. The results are shown in FIG. 13. In the graph of FIG. 13, the $H_2$ concentration is 1.8% by volume, the CO concentration is 2.7% by volume, and the NOx concentration is about 300 ppm, at the point b. For comparison purpose, the NOx concentration is set at the same level. In FIGS. 12 and 13, a solid line in region A represents the NOx concentration at the point a, and a dot line represents the NOx concentration at the point b. Further, a solid line in region B represents the NOx concentration at the point b, and a dot line represents the NOx concentration at the point c.

When FIG. 12 and FIG. 13 are compared, it is found that the catalyst 1 of the present invention is more excellent in the NOx purification rate, among the exhaust gas purifying catalyst 1 of the present invention and the three-way catalyst 7 not included in the scope of the present invention, judging from change in the NOx concentration of both catalysts in region A. It is also found that the catalyst 1 of the present invention has a NOx storage performance, since the catalyst 1 of the present invention shows larger shift width G in peak. Further, based on change in the NOx concentration in region B of both catalysts, it is found that even if the same NOx purifying catalyst 4 is used, the NOx purifying catalyst 4 placed downstream of the catalyst 1 of the present invention is more excellent in the NOx purification rate. The reason for this is that the $H_2/CO$ ratio is enhanced by the $H_2$ enrichment function of the catalyst 1 of the present invention as described above. Thus, it is understood that the exhaust gas purifying catalyst of the present invention, further, the exhaust gas purifying system of the present invention is by far excellent in the NOx purification rate.

A third exhaust gas purifying system of the present invention will be illustrated next.

Figure 11:
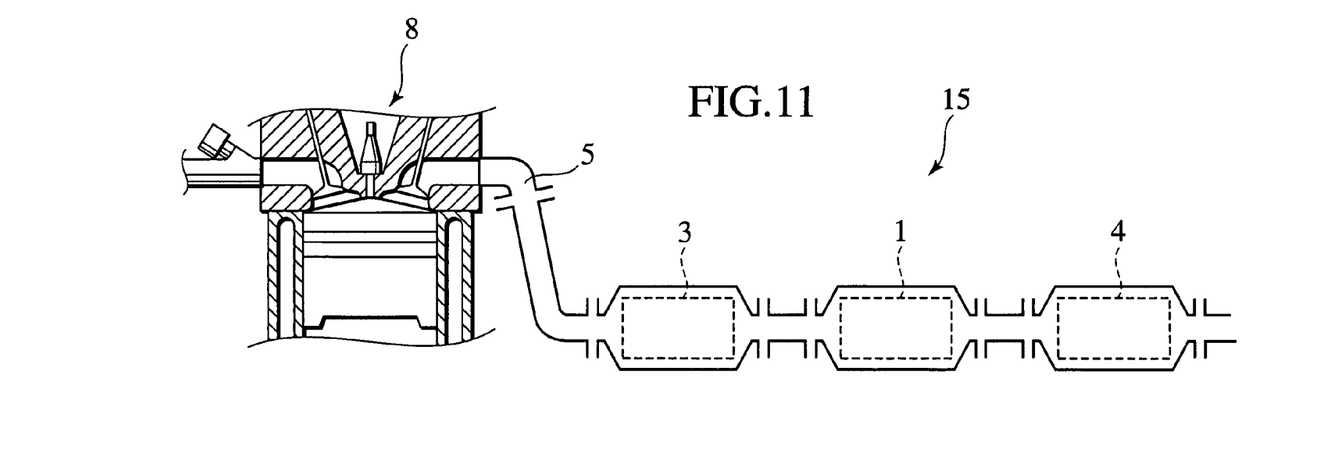
FIG. 11 is a schematic view showing the constitution of a third exhaust gas purifying system of the present invention.

As shown in FIG. 11, in a third exhaust gas purifying system 15 of the present invention, a noble metal catalyst 3 containing Pd is provided upstream, and an exhaust gas purifying catalyst 1 of the present invention is provided downstream of the catalyst 3, further, a NOx purifying catalyst 4 is provided downstream of the catalyst 1 of the present invention. The third exhaust gas purifying system 15 is a suitable example of the second exhaust gas purifying system 11 of the present invention, and an effect when the noble metal catalyst 3 containing Pd is placed upstream is the same as the effect in the case of the first exhaust gas purifying system 10. The third exhaust gas purifying system 15 is also regarded as that obtained by combining the first exhaust gas purifying system 10 with the second exhaust gas purifying system 11.

Here, in the first exhaust gas purifying system and third exhaust gas purifying system, it is preferable that the noble metal catalyst containing Pd and the exhaust gas purifying catalyst of the present invention are coated on separate substrates, since the process of coating on a substrate is not limited.

On the other hand, when the process of coating on a substrate is suitably controlled, it may also be permissible that the noble metal catalyst containing Pd is coated on the former portion of one substrate and the exhaust gas purifying catalyst of the present invention is coated on the backward portion of the substrate.

The method of producing an exhaust gas purifying catalyst of the present invention will be illustrated next.

The method of producing an exhaust-gas purifying catalyst of the present invention contains the following processes. First, a slurry is produced containing alumina and, ceria loading Pd and Pt. The resulted slurry is coated on a substrate, and then dried and baked.

The case of production of the catalyst of the present invention containing Rh includes the following processes. First, a slurry is produced containing alumina and, ceria loading Pd, Pt and Rh. Thus obtained slurry is coated on a substrate, then, dried and baked. Since it is preferable that Rh is loaded on alumina as described above, a production method described below is more preferable. First, Rh is loaded on alumina. And the Rh-loaded alumina is mixed with the slurry containing alumina and, ceria loading Pd and Pt. The resulted slurry is coated on a substrate, then, dried and baked.

As described above, the exhaust gas purifying catalyst of the present invention increases the $H_2$ concentration by permeation and production of $H_2$ to enhance a NOx purifying performance, therefore, it is necessary that Pt and Pd are loaded on ceria.

It is preferable that the exhaust gas purifying catalyst of the present invention contains Rh so that it can sufficiently exhibit functions such as CO selective purification and NOx poisoning relaxation and the like. When the catalyst of the present invention is allowed to contain Rh, Rh may be contained in the same layer as the ceria layer loading Pt and Pd. Namely, after production of a catalyst with other components, Rh may be inserted in the catalyst by a method of immersing the catalyst in a Rh solution. However, it is preferable that Rh is loaded on Zr-containing alumina as described above, thereby, the solid solution of Rh and alumina can be effectively suppressed. It becomes possible to prevent alloy formation of Rh with Pt by loading Rh and Pt on separate carriers. Further, it becomes possible to optimize placement of Pd, Pt and ceria, thereby, CO is selectively purified, and the $H_2$ concentration of an exhaust gas can be increased.

In preparing ceria loading Pd and Pt, it is desirable to use an acidic solution of a noble metal. Typically, a palladium nitrate solution and a dinitrodiaminoplatinum solution can be used.

A mutual combination of acidic solutions is preferable since coagulation of noble metals as occurring in the case of combination of an alkaline solution with an acidic solution does not occur easily, and loading noble metals on ceria in highly dispersed condition is possible.

The present invention will be illustrated further in detail by the following examples and comparative examples, however, the scope of the invention is not limited to these examples.

EXAMPLE 1

A dinitrodiaminoplatinum solution and a palladium nitrate solution were mixed, and cerium oxide (manufactured by Anan Kasei Co., Ltd.) was added. After stirring for 1 hour, the mixture was dried over night and day at 150° C. Thereafter, a 2% Pt-0.37% Pd/$CeO_2$ powder was obtained by baking at 400° C. for 2 hours in air.

Into a magnetic ball mill, this powder was added in a proportion of 93.3% of the total coating amount, γ-alumina was added in a proportion of 4.7% of the total coating amount, and alumina sol as a binder was added in a proportion of 2% of the total coating amount, these were mixed, further, a 10% of nitric acid solution was added to this, and the mixture was ground for 30 minutes to obtain a slurry.

This slurry was coated on an exhaust gas contact surface of a cordierite monolithic substrate (catalyst volume: 1.2 liter, cell number: 900 cells/2.5 mil), and an excess slurry was removed by air flow, dried, then, baked at 400° C. for 30 minutes. Thus, an exhaust gas purifying catalyst 1 of this example having a coating amount of 407 g/L was obtained. This catalyst 1 contains $CeO_2$ in an amount of 380 g/L, metal Pd in an amount of 1.4 g/L, and metal Pt in an amount of 7.6 g/L.

EXAMPLE 2

A dinitrodiaminoplatinum solution and a palladium nitrate solution were mixed, and cerium oxide (manufactured by Anan Kasei Co., Ltd.) was added. After stirring for 1 hour, the mixture was dried over night and day at 150° C. Thereafter, a 2% Pt-0.37% Pd/$CeO_2$ powder was obtained by baking at 400° C. for 2 hours in air.

Further, a 3% of Zr-containing alumina was added to a rhodium nitrate solution and the mixture was stirred for 1 hours, then, dried over night and day at 150° C. Thereafter, a 2% Rh/3% Zr-containing alumina powder was obtained by baking at 400° C. for 2 hours in air.

Into a magnetic ball mill, the 2% Pt-0.37% Pd/$CeO_2$ powder was added in a proportion of 93.3% of the total coating amount, the 2% Rh/3% Zr-containing alumina powder was added in a proportion of 4.7% of the total coating amount, and alumina sol as a binder was added in a proportion of 2% of the total coating amount, these were mixed, further, a 10% of nitric acid solution was added to this, and the mixture was ground for 30 minutes to obtain a slurry.

This slurry was coated on an exhaust gas contact surface of a cordierite monolithic substrate (catalyst volume: 1.2 liter, cell number: 900 cells/2.5 mil), and an excess slurry was removed by air flow, dried, then, baked at 400° C. for 30 minutes. Thus, an exhaust gas purifying catalyst 2 of this example having a coating amount of 407 g/L was obtained. This catalyst 2 contains $CeO_2$ in an amount of 380 g/L, metal Pd in an amount of 1.4 g/L, metal Pt in an amount of 7.6 g/L, and metal Rh in an amount of 0.38 g/L.

EXAMPLE 3

200 g of a 8% nitric acid aqueous solution of palladium nitrate was weighed as Pd, and diluted with water to give an amount of about 400 ml, and 570 g of active alumina having high surface area was added and the mixture was stirred for about 1 hours, then, the mixture was dried over night and day at 150° C. Thereafter, a 2.8% Pd/alumina powder was obtained by baking at 400° C. for 1 hour in air.

Into a magnetic ball mill, this powder was added in a proportion of 98% of the total coating amount, and alumina sol as a binder was added in a proportion of 2% of the total coating amount, these were mixed, further, a 10% of nitric acid solution was added to this, and the mixture was ground for 30 minutes to obtain a slurry.

This slurry was coated on an exhaust gas contact surface of a cordierite monolithic substrate (cell number: 900 cells/2.5 mil), and an excess slurry was removed by air flow, dried, then, baked at 400° C. for 30 minutes. Thus, a catalyst 3 containing Pd was obtained having a coating amount of 300 g/L.

This catalyst 3 (catalyst volume: 0.4 liter, cell number: 900 cells/2.5 mil) was placed upstream side and the catalyst 1 of Example 1 (catalyst volume: 0.8 liter, cell number: 900 cells/2.5 mil) was placed downstream side, to obtain an exhaust gas purifying system of the present invention (total catalyst volume: 1.2 liter).

EXAMPLE 4

A dinitrodiaminoplatinum solution was impregnated on active alumina, dried, then, baked at 400° C. for 1 hour in air, to obtain a Pt-loaded alumina powder (powder A). This powder A had a Pt concentration of 3.0%. Next, a rhodium nitrate solution was impregnated on an active alumina powder, dried, then, baked at 400° C. for 1 hour in air, to obtain a Rh-loaded alumina powder (powder B). This powder B had a Rh concentration of 2.0%.

Into a magnetic ball mill, 576 g of the above-mentioned powder A, 86 g of the powder B, 238 g of the active alumina powder and 900 g of water were charged, and mixed and ground to obtain a slurry.

This slurry was coated on an exhaust gas contact surface of a cordierite monolithic substrate (catalyst volume: 1.7 liter, cell number: 400 cell), and an excess slurry was removed by air flow, dried, then, baked at 400° C. for 1 hour. Thus, a catalyst having a coating amount of 200 g/L was obtained.

Further, this catalyst was impregnated in a barium aqueous solution, dried, then, baked at 400° C. for 1 hour. Thus, a NOx purifying catalyst (catalyst 4) having a coating amount of 250 g/L was obtained.

The catalyst 1 produced in Example 1 was place upstream of an exhaust gas flow route, and the above-mentioned catalyst 4 was placed downstream, to obtain an exhaust gas purifying system of the present invention.

EXAMPLE 5

The catalyst 3 was placed upstream of the catalyst 1 produced in Example 1, further, the catalyst 4 was placed downstream of the catalyst 1, to obtain an exhaust gas purifying system of the present invention.

COMPARATIVE EXAMPLE 1

Cerium oxide (manufactured by Anan Kasei Co., Ltd.) was added into a dinitrodiaminoplatinum solution and the mixture was stirred for 1 hour, then, the mixture was dried over night and day at 150° C. Thereafter, a 2% Pt/$CeO_2$ powder was obtained by baking at 400° C. for 2 hours in air. Then, γ-alumina was added to a palladium nitrate solution, the mixture was stirred for 1 hour, then, the mixture was dried over night and day at 150° C. Thereafter, a 4% Pd/alumina powder was obtained by baking at 400° C. for 2 hours in air.

Into a magnetic ball mill, the 2% Pt/$CeO_2$ powder was added in a proportion of 89.7% of the total coating amount, the 4% Pd/alumina powder was added in a proportion of 8.3% of the total coating amount, and alumina sol as a binder was added in a proportion of 2.0% of the total coating amount, these were mixed, further, a 10% of nitric acid solution was added to this, and the mixture was ground for 30 minutes to obtain a slurry.

This slurry was coated on an exhaust gas contact surface of a cordierite monolithic substrate (catalyst volume: 1.2 liter, cell number: 900 cells/2.5 mil), and an excess slurry was removed by air flow, dried, then, baked at 400° C. for 30 minutes. Thus, an exhaust gas purifying catalyst 5 of this example having a coating amount of 423 g/L was obtained. This catalyst 5 contains $CeO_2$ in an amount of 380 g/L, metal Pd in an amount of 1.4 g/L, and metal Pt in an amount of 7.6 g/L.

COMPARATIVE EXAMPLE 2

Cerium oxide (manufactured by Anan Kasei Co., Ltd.) was added into a dinitrodiaminoplatinum solution and the mixture was stirred for 1 hour, then, the mixture was dried over night and day at 150° C. Thereafter, a 2% Pt/$CeO_2$ powder was obtained by baking at 400° C. for 2 hours in air.

Into a magnetic ball mill, the 2% Pt/$CeO_2$ powder was added in a proportion of 93.4% of the total coating amount, a γ-alumina powder was added in a proportion of 4.7% of the total coating amount, and alumina sol as a binder was added in a proportion of 1.9% of the total coating amount, these were mixed, further, a 10% of nitric acid solution was added to this, and the mixture was ground for 30 minutes to obtain a slurry.

This slurry was coated on an exhaust gas contact surface of a cordierite monolithic substrate (catalyst volume: 1.2 liter, cell number: 900 cells/2.5 mil), and an excess slurry was removed by air flow, dried, then, baked at 400° C. for 30 minutes. Thus, an exhaust gas purifying catalyst 6 of this example having a coating amount of 407 g/L was obtained. This catalyst 6 contains $CeO_2$ in an amount of 380 g/L, and metal Pt in an amount of 7.6 g/L.

COMPARATIVE EXAMPLE 3

Cerium oxide (manufactured by Anan Kasei Co., Ltd.) was added into a palladium nitrate solution and the mixture was stirred for 1 hour, then, the mixture was dried over night and day at 150° C. Thereafter, a 2% Pd/$CeO_2$ powder was obtained by baking at 400° C. for 2 hours in air.

Into a magnetic ball mill, the 2% Pd/$CeO_2$ powder was added in a proportion of 93.4% of the total coating amount, a γ-alumina powder was added in a proportion of 4.7% of the total coating amount, and alumina sol as a binder was added in a proportion of 1.9% of the total coating amount, these were mixed, a 10% of nitric acid solution was added to this, and the mixture was ground for 30 minutes to obtain a slurry.

This slurry was coated on an exhaust gas contact surface of a cordierite monolithic substrate (catalyst volume: 1.2 liter, cell number: 900 cells/2.5 mil), and an excess slurry was removed by air flow, dried, then, baked at 400° C. for 30 minutes. Thus, an exhaust gas purifying catalyst 7 of this example having a coating amount of 407 g/L was obtained. This catalyst 7 contains $CeO_2$ in an amount of 380 g/L, and metal Pd in an amount of 7.6 g/L.

Figure 14:
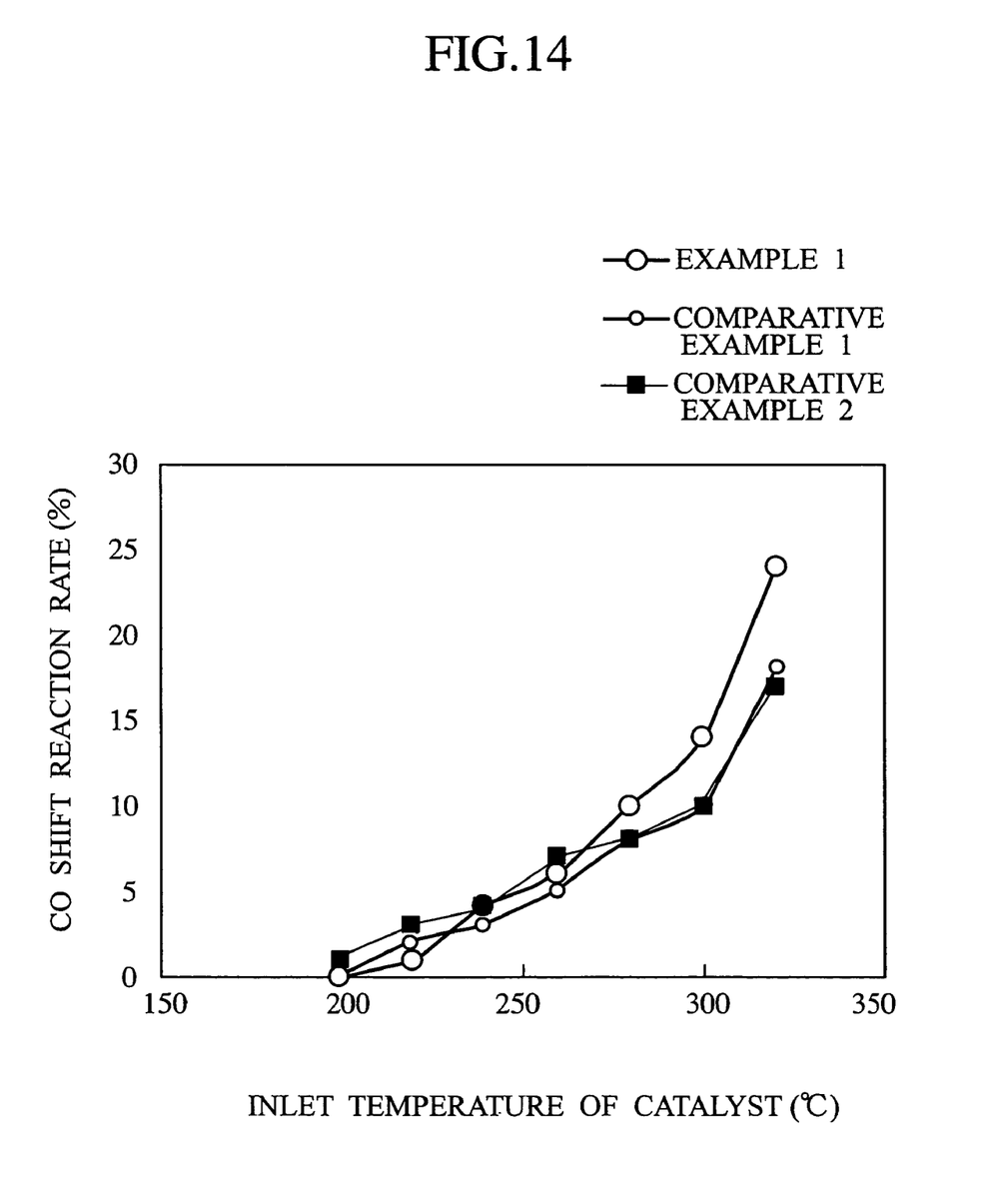
FIG. 14 is a graph showing the CO shift reaction rate against the inlet temperature of catalysts in examples and comparative examples.

Under conditions described below, the catalysts of Examples 1 and 2 and Comparative Examples 1 to 3 were baked in a muffle furnace at 900° C. for 1 hour to cause quick deterioration, and the condition of Pd was measured by XPS. This sample was quickly tested for durability, then, model gas evaluation was conducted, to compare the CO shift reaction rate. The obtained results are shown in Table 1. Further, correlations between the catalyst inlet temperature and the CO shift reaction rate in several examples are shown in FIG. 14.

The XPS measurement conditions were as described below. The apparatus used was surface analysis apparatus ESCA-5600 manufactured by ULVAC-PHI, Inc. Mg-Kα line (1253.6 eV) was used as the X-ray source, and measurement was conducted at 300 W. The measurement depth was about 4 nm (photoelectron emission angle: 45°), and the measurement area was 2 nm×0.8 mm. As pretreatment, the sample was powder-compression-molded.

The durability conditions were as described below. The displacement of an engine used in durability was 3000 cc, and gasoline (trade name: Nisseki Dash) was used as a fuel. The durability temperature was 750° C., and the durability time was 30 hours.

The model gas evaluation conditions were as described below. The reaction gas composition of a rich gas is CO: 1% by volume, $H_2$: 1% by volume, $H_2O$: 3% by volume. The reaction gas composition of a lean gas is CO: 1% by volume, $H_2O$: 3% by volume, NOx: 0.1% by volume, $O_2$: 3% by volume. Regarding the gas variation, a lean gas has a cycle of 60 seconds, and a rich gas has a cycle of 120 seconds. The reaction temperature is from 250 to 350° C., and the space velocity is 72000 $h^{-1}$. The CO shift reaction rate was determined by the following formula (iii).

(CO shift reaction rate)=[(inlet concentration of CO gas)−(outlet concentration of CO)]/(inlet concentration of CO gas)×100     (iii)

In the formula (iii), the inlet concentration is a concentration of the inlet of each catalyst at 120 second after changing from a lean gas to a rich gas, and the outlet concentration is a concentration of the outlet of each catalyst at 120 second after changing from a lean gas to a rich gas.

TABLE 1

| | Ratio of $PdO_2$ to PdO | CO shift reaction rate (%) | | |
| --- | --- | --- | --- | --- |
| | | 280° C. | 300° C. | 320° C. |
| Example 1 | 0.71:0.29 | 10 | 14 | 24 |
| Example 2 | 0.70:0.30 | 9 | 13 | 20 |
| Comparative example 1 | 0.65:0.35 | 8 | 10 | 18 |
| Comparative example 2 | — | 8 | 10 | 17 |
| Comparative example 3 | 0.64:0.36 | 1 | 2 | 3 |

Under conditions described below, the exhaust gas purifying catalysts of Examples 1 and Comparative Example 3 and the exhaust gas purifying system of Example 3 were deteriorated quickly, and the exhaust gas purifying catalyst and the exhaust gas purifying system were evaluated on an engine, and the CO selective oxidation ratio was compared. The results are shown in Table 2.

The durability conditions were as described below. The engine displacement used in the durability test was 3000 cc, and gasoline was used as a fuel (trade name: Nisseki Dash). The durability temperature was 750° C., and the durability time was 30 hours.

The engine evaluation conditions were as described below. The gas generation apparatus used was a 6 cylinder gasoline engine manufactured by Nissan Motor Co., Ltd. The exhaust gas flow rate was 19.2 g/sec, and the exhaust gas temperature was 400° C. The gas changing is repetition of 40 seconds of lean and 2 seconds of rich. Regarding the gas composition, lean has A/F of about 18 and rich has A/F of about 11.

The evaluation was conducted by repeating lean and rich under the above-mentioned conditions. The CO reduction amount is calculated by the following formula (iv) using peak top of the CO concentration when changed to rich.

(CO reduction amount)=(peak top of CO at inlet)−(peak top of CO at outlet)     (iv)

The $H_2$ concentration was measured by gas chromatography manufactured by Hitachi, Ltd. after bag sampling for 7 minutes. Since no discharge of $H_2$ from an engine was confirmed in lean, the $H_2$ concentration at rich spike is calculated from the following formula (v). Further, the $H_2$ reduction amount is calculated from the following formula (vi).

($H_2$ concentration)=($H_2$ concentration in bag)×(42 seconds)/(2 seconds)     (v)

($H_2$ reduction amount)=($H_2$ concentration at catalyst inlet)−($H_2$ concentration at catalyst outlet)     (vi)

TABLE 2

| | | CO reduction amount/ $H_2$ reduction amount | | |
| --- | --- | --- | --- | --- |
| | Ratio of $PdO_2$ to PdO | 280° C. | 300° C. | 320° C. |
| Example 1 | 0.71:0.29 | 10 | 14 | 24 |
| Example 3 | 0.71:0.29 | 9 | 13 | 20 |
| Comparative example 3 | 0.64:0.36 | 1 | 2 | 3 |

It is seen from Table 1 that the catalysts of Examples 1 and 2 included in the scope of the present invention have higher CO shift reaction rate and excellent in $H_2$ production ability as compared with Comparative Examples 1 to 3 not included in the scope of the invention. Further, it is seen from FIG. 14 that the catalyst of Example has higher CO shift reaction rate in wider temperature range and excellent in $H_2$ production ability as compared with Comparative Examples 1 and 2. Further, it is seen from Table 2 that the exhaust gas purifying catalyst of Example 1 and the exhaust gas purifying system of Example 3included in the scope of the invention have larger CO reduction amount/$H_2$ reduction amount and have a property that CO consumption is larger than $H_2$ consumption, namely, excellent in $H_2$ production ability as compared with Comparative Example 3.

Under current conditions, it is guessed that Example 1 provides the best results since the CO shift reaction rate is large in model gas evaluation and the ratio of PdO is highest by XPS.

The entire contents of Japanese Patent Applications No. P2003-168739 with a filing date of Jun. 13, 2003 and No. P2004-109324 with a filing date of Apr. 1, 2004 are herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An exhaust gas purifying catalyst, comprising:
alumina; and
ceria loading palladium and platinum,
wherein the ratio of palladium (IV) oxide to palladium (II) oxide by peak separation of the 3d orbital of palladium in X-ray photoelectron spectroscopy is within a range from 70:30 to 99:1.

2. An exhaust gas purifying catalyst according to claim 1, wherein the exhaust gas purifying catalyst reduces a carbon monoxide concentration and increases a hydrogen concentration in an exhaust gas.

3. An exhaust gas purifying catalyst according to claim 1, wherein a content ratio of palladium to platinum is within a range from 0.01:1 to 0.3:1 by weight.

4. An exhaust gas purifying catalyst according to claim 1, further comprising rhodium.

5. An exhaust gas purifying catalyst according to claim 4, wherein a rhodium content is within a range from 0.01 to 1 g per 1 liter of the catalyst.

6. An exhaust gas purifying catalyst according to claim 5, wherein the rhodium content is within a range from 0.1 to 0.4 g per 1 liter of the catalyst.

7. An exhaust gas purifying catalyst according to claim 4, wherein rhodium is loaded on the alumina.

8. An exhaust gas purifying catalyst according to claim 7, wherein the alumina is zirconia-containing alumina.

9. An exhaust gas purifying catalyst according to claim 4, wherein the exhaust gas purifying catalyst adsorbs NOx in a lean region and releases NOx in a rich region.

10. An exhaust gas purifying catalyst according to claim 1, wherein, in loading palladium and platinum on ceria, an acidic solution of palladium and an acidic solution of platinum are used.

11. An exhaust gas purifying catalyst according to claim 10, wherein the acidic solution of palladium is a palladium nitrate solution and the acidic solution of platinum is a dinitrodiaminoplatinum solution.

12. An exhaust gas purifying system, comprising:
an exhaust gas purifying catalyst including alumina, and ceria loading palladium and platinum,
wherein the ratio of palladium (IV) oxide to palladium (II) oxide by peak separation of the 3d orbital of palladium in X-ray photoelectron spectroscopy is within a range from 70:30 to 99:1.

13. An exhaust gas purifying system according to claim 12, further comprising:
a noble metal catalyst provided upstream of the exhaust gas purifying catalyst, the noble metal catalyst containing palladium.

14. An exhaust gas purifying system according to claim 12, further comprising:
a nitrogen oxide purifying catalyst provided downstream of the exhaust gas purifying catalyst.

15. An exhaust gas purifying system according to claim 12, wherein the exhaust gas purifying catalyst reduces a carbon monoxide concentration and increases a hydrogen concentration in an exhaust gas.

16. An exhaust gas purifying system according to claim 12, wherein a content ratio of palladium to platinum is within a range from 0.01:1 to 0.3:1 by weight.

17. An exhaust gas purifying system according to claim 12, further comprising rhodium.

18. An exhaust gas purifying system according to claim 17, wherein a rhodium content is within a range from 0.01 to 1 g per 1 liter of the catalyst.

19. An exhaust gas purifying system according to claim 18, wherein the rhodium content is within a range from 0.1 to 0.4 g per 1 liter of the catalyst.

20. An exhaust gas purifying system according to claim 17, wherein rhodium is loaded on the alumina.

21. An exhaust gas purifying system according to claim 20, wherein the alumina is zirconia-containing alumina.

22. An exhaust gas purifying system according to claim 17, wherein the exhaust gas purifying catalyst adsorbs NOx in a lean region and releases NOx in a rich region.

* * * * *